SUPERCONDUCTOR GATING OR SWITCHING DEVICES

Filed April 25, 1967 4 Sheets-Sheet 1

INVENTOR.
John L. Artley
BY
Roland A. Anderson
ATTORNEY.

INVENTOR.
John L. Artley
BY
Roland A. Anderson
ATTORNEY.

INVENTOR.
John L. Artley
BY
Roland A. Anderson
ATTORNEY.

INVENTOR.
John L. Artley
BY
Roland A. Anderson
ATTORNEY.

United States Patent Office 3,505,538
Patented Apr. 7, 1970

3,505,538

SUPERCONDUCTOR GATING OR SWITCHING DEVICES

John L. Artley, Durham, N.C., assignor to the United States of America as represented by the United States Atomic Energy Commission Filed Apr. 25, 1967, Ser. No. 634,794
Int. Cl. H03k 3/38, 17/84
U.S. Cl. 307—245 5 Claims

ABSTRACT OF THE DISCLOSURE

Coherent domain wall motion or the establishment of such a domain wall in a thin-film ferromagnetic material, as controlled by an applied magnetic field, is utilized to effect switching of the current in a superconducting thin-film gate circuit. The thin-film ferromagnetic material is placed adjacent to the superconducting thin film of the gate circuit with a thin film of insulating material therebetween. The switching that is effected is such that an effective open or closed circuit can be retained, as desired.

BACKGROUND OF THE INVENTION

The invention described herein was made in the course of, or under, a contract with the U.S. Atomic Energy Commission.

The present invention pertains to the field of art including superconducting circuit elements such as cryotrons and similar devices and the means for effecting the switching of such elements.

U.S. Patent No. 3,283,282, dated Nov. 1, 1966, relates to a cryotron and various control means therefore wherein the gate resistance of the superconducting element of the cryotron can be varied over a wide range without the use of critical biasing magnetic fields, such a wide range of the gate resistance being a function of the control current to the control lead of the cryotron.

U.S. Patent No. 3,263,220, dated July 26, 1966, relates to the use of superconducting materials and their control by magnetic fields for achieving logical and memory functions, and, with particular reference to FIGURES 1 and 9 thereof, there is disclosed an operation wherein a switching function can be achieved by providing pulses of magnitude less or more than the pulse amplitude normally used for storing or writing in the memory cell of the device.

In neither of the above prior patents is there any means disclosed for achieving a switching of a superconducting element and then retaining such a switched condition of the element regardless of any changes in the control current to such devices. On the other hand, the present invention was conceived to provide means to achieve such a function or operation of a superconducting element.

SUMMARY OF THE INVENTION

In view of the above limitations of the prior art, it is the object of the present invention to provide a means for achieving a switching or gating of a superconducting thin-film element and to retain such a switched condition of the element. The above object has been accomplished in the present invention by providing a thin film of ferromagnetic material in close proximity to a superconducting thin film with a layer of insulating material therebetween. A control element is utilized to effect the formation of a magnetic domain wall in the ferromagnetic material, and this domain wall is utilized to effect a switching of the superconducting thin film and to retain such a switched condtion thereof.

DESCRIPTION OF THE PREFERRED EMBODIMENTS

The resistance of a superconducting film increases from zero to some normal value in a nonlinear manner as the magnetic field intensity increases at the surface of the film, as clearly set forth in the above-mentioned prior art patents. However, the use of domain walls in ferromaggentic thin films in conjunction with and for switching superconducting thin films is outside the scope of or teachings of the above prior patents. It has been estimated that the magnetic field intensity at a 180-degree domain wall of a ferromagnetic thin film is of the order of 400 oersteds at a distance of $10^4$ A. above the wall. Such a field intensity in close proximity to a superconducting thin film is sufficient to effect the transition from the superconducting to the normal state of the thin film, and this concept forms the basis for the present invention. Also, once the domain wall has been established, the wall remains static and in position after removal of the excitation current such that the domain wall can effect the desired switching of the superconducting thin film and retain such a switched condition thereof.

Figures 1, 2:
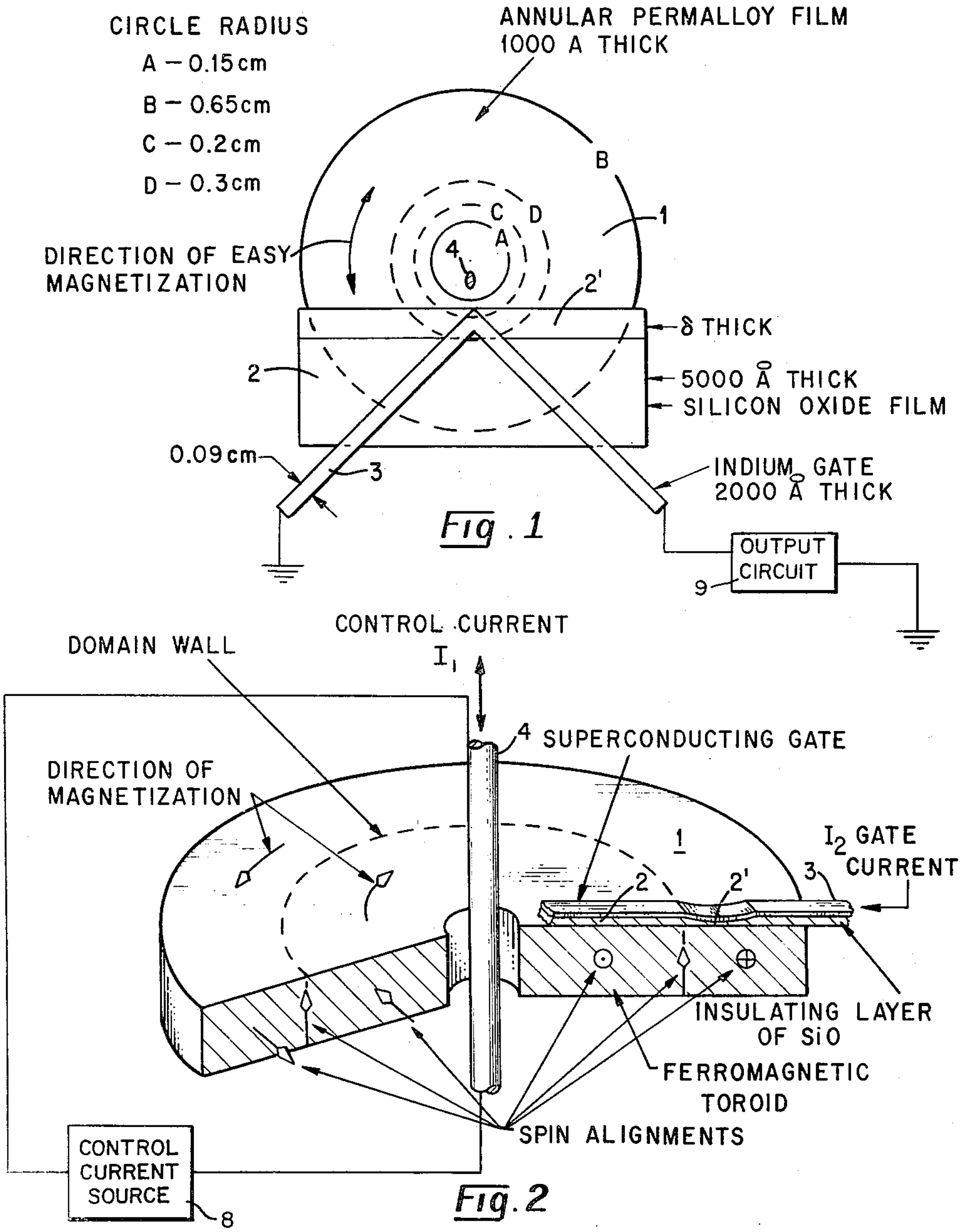
FIG. 1 is a schematic showing of one embodiment of the present invention for accomplishing the above object.
FIG. 2 is an enlarged schematic showing of the device of FIG. 1 for illustrating the operation principle thereof.
Figure 3:
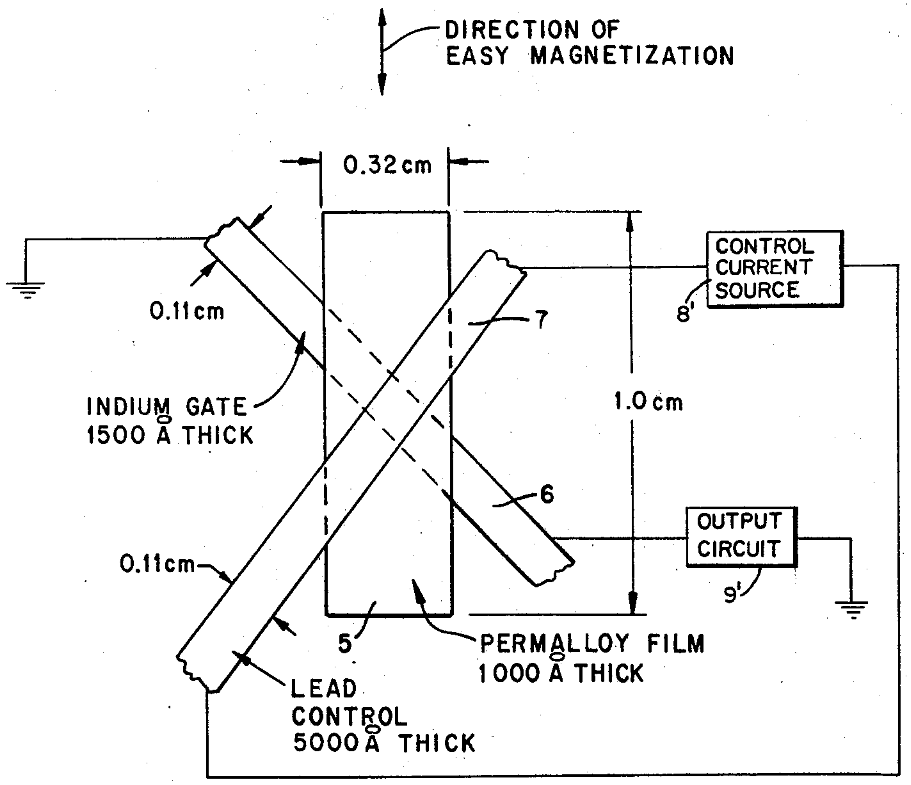
FIG. 3 is a schematic showing of another embodiment of the present invention which illustrates a ferromagnetic cryotron configuration.

In the present invention, domain walls in thin Permalloy (80 Ni, 20 Fe) films are brought near thin superconducting films of indium in two different embodiments. These embodiments are called the annular embodiment, as shown in FIG. 1 and FIG. 2, and the ferromagnetic cryotron embodiment, as shown in FIG. 3. It should be noted that Permalloy films are employed in the present invention as the ferromagnetic films to avoid any problems of magnetostriction.

The annular embodiment of FIG. 1 includes an annular Permalloy film 1 which is about 1000 A. thick, a silicon oxide insulating layer or film having a portion 2 of about 5000 A. thick and a portion 2' with a selected thickness from near zero to 1000 A., a chevron-shaped indium gate 3 with a thickness of about 2000 A., and a drive current wire 4 which passes through a centrally disposed aperture defined by circle A in the film 1. The portion 2 of the silicon oxide film is made 5000 A. thick to keep a portion of the indium gate 3 far enough away from the Permalloy film 1 to nullify the effect of the domain walls in the Permalloy film. As can be seen in FIG. 1, the tip of the indium gate 3 is separated from the film 1 by the portion 2' of the silicon oxide film, and this tip of gate 3 overlaps a region of the Permalloy film 1 defined by circles C and D thereof and it is in this region where switching of the superconducting gate 3 is to be effected in a manner to be described below. The device of FIG. 1 is not drawn to scale and the radius of each of the circles A, B, C, and D is shown in the drawing.

It should be noted that the easy direction of magnetization was obtained in the Permalloy by deposition of the Permalloy film on a glass substrate in the presence of a magnetic field produced by a ten-ampere current in a long conductor placed along the axis of the annular ring. An understanding of the annular embodiment operation principle will be evident from the description of FIG. 2 as will now be described. It will be noted in FIG. 2 that the thin portion 2′ of the silicon oxide film is not in the same position as that shown in FIG. 1. The position of such a thin portion of the silicon oxide film can be located in any desired postion, and it is shown where it is in FIG. 2 for the sake of illustration only.

The principle of controlled domain wall movement can be explained quite simply. Establishment of a steady value of control current $I_1$ from a source 8 in an upward direction, in the conductor 4 of FIG. 2, is accompanied by the establishment of a counterclockwise-directed magnetic field and a corresponding counterclocwise magnetization of the entire toroid 1. The field intensity and flux density are inverse functions of radial distance from the conductor 4. In the toroid 1 they will be maximum at the inner radius. If, now, the control current is reduced to zero, the toroid remains magnetized in the counterclockwise direction. Now, a gradual increase of control current in the downward (reverse) direction in conductor 4 will be accompanied by an increase of applied magnetic field intensity in the clockwise (reverse) direction. At some value of reversed control current, the intensity of the reversed applied field will be sufficient at the inner radius of the toroid to reverse the direction of magnetization of the material at that radius. A further increase of control current in the reverse direction (downward in conductor 4) will now enlarge the area (domain) of clockwise magnetization in a radial direction. The magnetic domain wall between the two oppositely magnetized domains will, then, move radially outward as $I_1$ is increased still further in the reversed direction. As the domain wall moves radially outward to a point short of that at which the gate film 3 and the toroid 1 are closest together, the domain-wall field (400 oersteds) that reaches or is available at the superconductor 3 will be below the critical value for the material due to the portion 2 of the SiO insulating film, and the gate circuit will remain superconducting. As the domain wall moves farther (radially outward), however, the gate film 3 at the region 2′ of the SiO film is briefly exposed to a field intensity that exceeds the critical value, and the resulting introduction of resistance into the otherwise superconducting gate circuit of an output circuit 9 switches off the gate current.

If it is desired to retain the gate current switched off, the current in conductor 4 can then be terminated and the domain wall in the toroid 1 will remain in its last position to thus keep the gate current in film 3 switched off. However, if it is desired to permit the gate film 3 to return to the superconducting state, the domain wall in the toroid 1 is made to move even farther radially outward past the switching region of closest proximity of the gate film to the domain wall by a further increase (downward) of the control current in the conductor 4. A succession of radially moving domain walls can be propagated in the Permalloy film 1, if desired, by causing increasing amounts of control current to flow in the conductor 4 first in one direction and then in the other direction.

It should be noted that only about 4 oersteds of magnetic field intensity are required for domain wall movement, and, since the domain wall junction field is approximately 400 oersteds just above the domain wall, a gain of about 100 is realized in establishing a ring-shaped region of concentrated field intensity. Thus, it is this controllable "field amplification" and its position which is utilized in the device of FIG. 1 and FIG. 2 to switch the gate current $I_2$ in the superconducting film 3.

The basic principle of the device of FIGS. 1 and 2 may be utilized in a variety of ways; that is, information storage via persistent currents in the superconducting paths, amplification through control of large superconductive currents by small control currents via the field-amplification mechanism, oscillation and modulation through suitable modification of the multivibrator action by means of passing the control current alternately in one direction and then in the other direction through the control conductor 4, and computer gate logic.

In FIG. 3, which illustrates the ferromagnetic cryotron embodiment of the present invention, a Permalloy film 5 having a thickness of 1000 A. is positioned between an indium gate film 6 having a thickness of 1500 A. and a lead control film 7 having a thickness of 5000 A., for example. The Permalloy film 5 was deposited on a glass substrate in the presence of a uniform magnetic field of about 20 oersteds along the direction of easy magnetization. The lead control film is positioned over both the Permalloy film 5 and the indium film 6. A 500-A.-thick silicon oxide film separates the indium and Permalloy films. The lead and Permalloy films are separated by a 2000-A.-thick film of silicon oxide.

The embodiment of FIG. 3 operates in a different manner than that for FIGS. 1 and 2, as described above. In FIG. 3, no value of negative control current from a source 8′ in the lead control 7 would effect or cause the formation of any domain walls in the Permalloy film 5. However, the application of a positive current of 100 milliamperes or above to the lead control film 7 will effect and will cause the formation of domain walls in the Permalloy film 5 along each edge of the control film 7 in a manner which will cause the domain walls to "cross" the gate film 6. The magnitude of the magnetic field between the control film 7 and the gate film 6, with at least +100 ma. in the control film 7, is approximately 1.1 oersteds. This field intensity is sufficient to "switch" the Permalloy film 5 such that a region of reversal of magnetization exists in the Permalloy film under the control film 7 when a positive current of at least +100 ma. is applied to the control film 7. The domain walls in the Permalloy film 5, mentioned above, are formed by this reversal of magnetism in the film 5. Increase of the control current in film 7 above +100 ma. will also switch the magnetic film to form the domain walls under the control film, but would not influence the position of the domain walls in a marked manner. As mentioned above, a negative control current would not form any domain walls in the Permalloy film.

Once the domain walls are formed in the Permalloy film 5 of FIG. 3, as described above, these walls provide a field intensity of about 400 oersteds below the domain wall and this field intensity will effect a switching of the superconducting gate film 6, connected to an output circuit 9′ in the same manner as in the device of FIG. 1. Thus, the device of FIG. 3 is also suitable for computer gate logic systems.

In both embodiments of the present invention the Permalloy films were deposited in one vacuum system and the remaining films were deposited in a different vacuum system. The Permalloy films were deposited by electron bombardment of a Permalloy rod in a vacuum between $10^{-4}$ and $10^{-5}$ torr. The lead, indium, and silicon oxide films were deposited in a vacuum of about $10^{-5}$ torr. The glass substrates were at room temperature for all depositions.

The thin film embodiments were immersed in liquid helium having a temperature a little above 3° K by the use of a dip stick with appropriate electrical connections. All indium films behaved as superconductors at sufficiently low values of electrical current. The voltage across the indium gates were observed as a function of currents in the gates while the films were maintained in the constant temperature helium bath. The space available in the cryostat precluded the use of a long drive current wire along the axis of the annulus in the annular embodiment of FIG. 1, so a loop of wire passing through the center was used.

In both embodiments of the present invention, the respective devices are immersed in a liquid helium which is contained in suitable containers in a conventional manner such as disclosed in Patent No. 3,048,707 to Nyberg, issued Aug. 7, 1962, for example.

Figure 4:
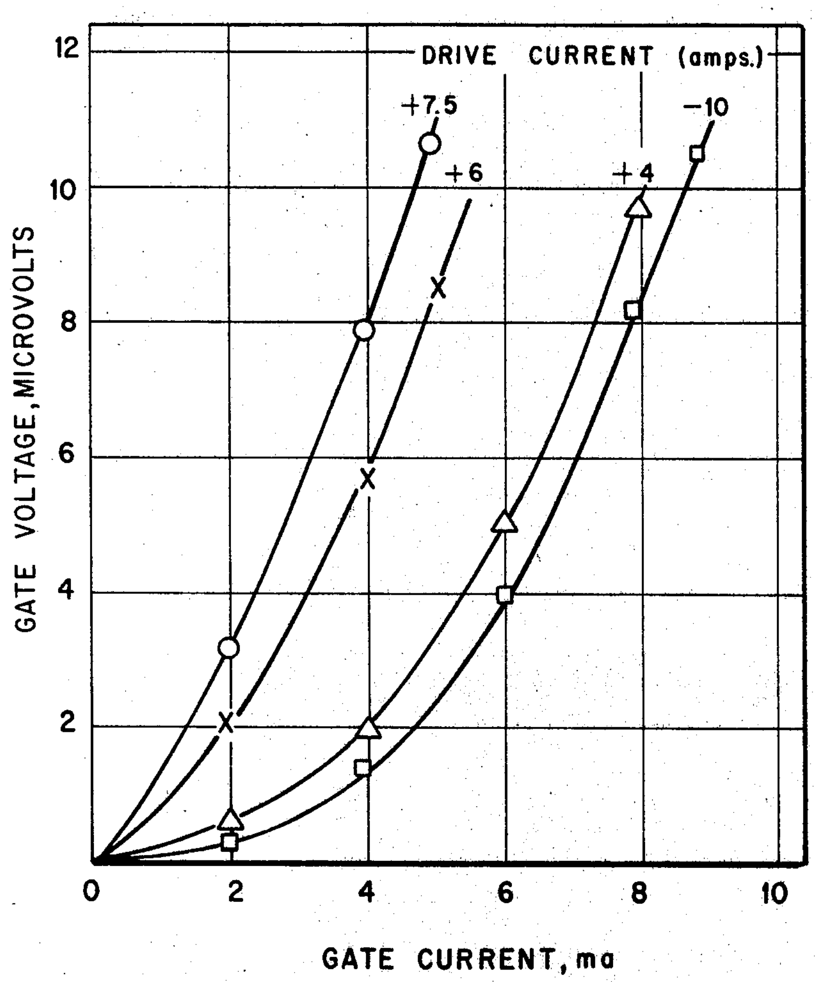
FIG. 4 is a graph illustrating the gate voltage-current characteristics for the embodiment of FIG. 1, each curve being obtained after removal of the drive current indicated.

The results obtained with the annnular embodiment of FIG. 1, with the portion 2' being zero, are shown in FIG. 4. The drive currents were pulsed (pulse duration the order of seconds) before the curves were observed. The large negative drive current pulse, which was sufficient to drive the domain wall out of the region of major influence (between circles C and D), corresponds to the curve which displays minimum gate voltage for a given gate current. After the −10 ampere drive current had existed in the drive conductor 4, there was no influence of negative drive current pulses on the gate voltage-vs.-gate current characteristic. That is, application of −4, −6, and −7.5 ampere pulses in the conductor 4 yielded results which coincided with the curve designated by the −10 ampere curve.

Curves for the annnular embodiment of FIG. 1 for different thicknesses of silicon oxide film 2' in the region between circles C and D showed that the effects shown in FIG. 4 diminished as the silicon oxide thickness for portion 2' increased. The curves obtained, not shown, when the portion 2' had a thickness of 1000 A. displayed no change in the gate characteristics as various drive current pulses were used. The curves obtained, not shown, when the portion 2' had a thickness of 500 A. displayed less pronounced influence of the drive current pulse on the gate voltage-current characteristics.

Figure 5:
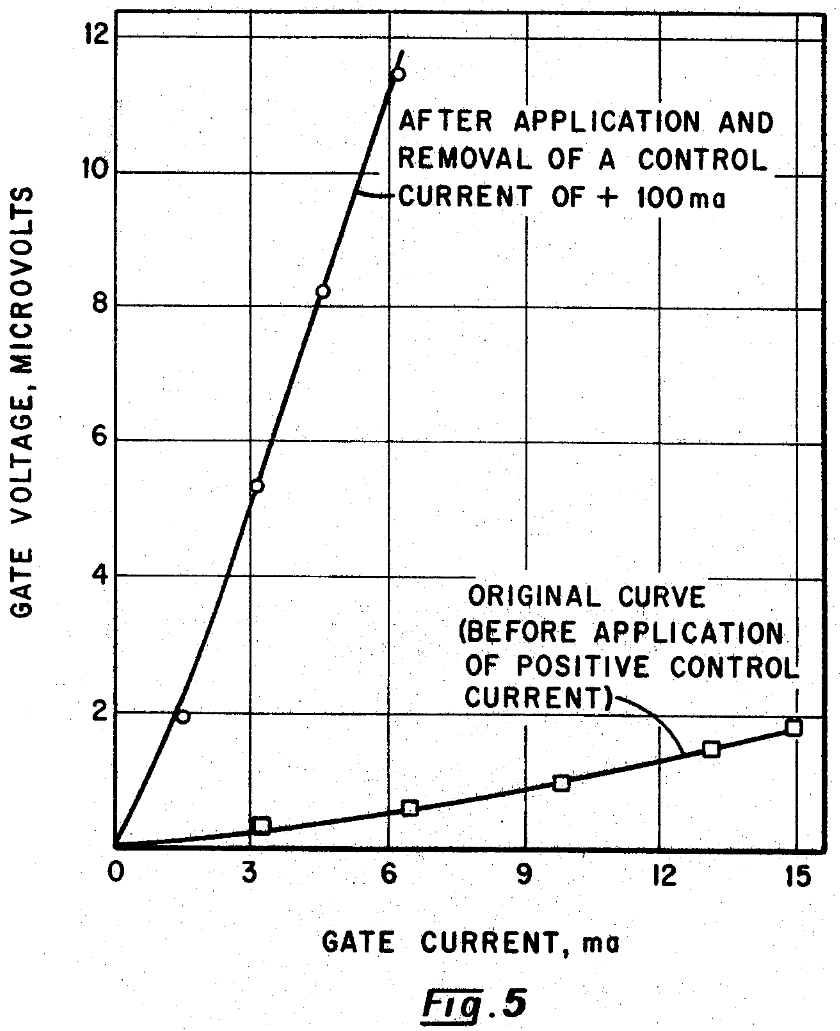
FIG. 5 is a graph illustrating the gate voltage-current characteristics for the cryotron embodiment of FIG. 3.

FIG. 5 shows the influence of the application of control current in the embodiment of FIG. 3. After the +100 ma. control current curve was established, it was not possible to move from that curve by the application of any positive control pulse. That is, a control current pulse of +100 ma. in the lead control film 7 introduced permanent switching so that no other positive control pulse could change the characteristic. After the positive control current pulse was applied, a negative control current tended to return the voltage-vs.-current curves toward the original curve. However, it was not possible to return to the original curve while the material was maintained at superconducting temperatures. External Helmholtz coils were used to apply an external field of about 40 oersteds but with no permanent effect. Increasing the temperature of the cryotron above the superconduction transition temperature of the indium permitted the gate to be reset (return to the original curve, FIG. 5).

From the above description of the operating results of the embodiments of FIG. 1 and FIG. 3, it should be evident that the switching of a superconducting thin film can be effected either by the controlled movement of a magnetic domain wall in a thin film of ferromagnetic material placed in close proximity to the superconducting thin film (as in FIG. 1), or by the establishment of a magnetic domain wall in a ferromagnetic thin film, placed close to the superconducting thin film, by means of a lead control current of at least +100 ma. in a lead control thin film adjacent to the ferromagnetic thin film (as in FIG. 3). As mentioned above, the switching effected by the embodiment of FIG. 3 is permanent as long as superconducting temperatures are maintained, and the switching effected by the embodiment of FIG. 1 can be permanent, if desired, or periodic, depending upon the desired use thereof.

It should be understood that the use of indium for the superconducting thin films in the devices described above is by way of example, and other superconducting thin films could equally be used, if desired.

This invention has been described by way of illustration rather than limitation and it should be apparent that it is equally applicable in fields other than those described.

What is claimed is:

1. A system for switching the current in a superconducting material comprising a thin film of said material adapted to be connected into a gate circuit, a ferromagnetic thin film positioned adjacent to said superconducting thin film, a thin layer of insulation of selected thickness disposed between said thin films, an electrical lead control conductor positioned adjacent to said ferromagnetic thin film, power supply means connected to said conductor for effecting the passage of selected amounts of current therethrough for magnetizing said ferromagnetic thin film and effecting the formation of domain walls therein, a container for housing said thin films and conductor, means disposed within said container for normally maintaining said superconducting thin film at a superconducting temperature, and means for connecting said superconducting thin film to said gate circuit which is external to said container, whereby the selected thickness of said thin layer of insulation is of such value that said formation of said domain walls in said ferromagnetic thin film will effect the transition of said superconducting thin film from the superconducting to the normal state and maintain it in such normal state until such time as the current flow through said control conductor is reversed.

2. The system set forth in claim 1, wherein said ferromagnetic thin film is fabricated from Permalloy and is the shape of a toroid provided with a centrally located aperture, said superconducting thin film being chevron-shaped and fabricated from indium and being positioned adjacent to a sector portion of said toroid, said insulation being fabricated from silicon oxide and being provided with a relatively thick section and a relatively thin section, said thin section of insulation being at a position where switching is to be effected, said electrical control conductor being positioned axially within said toroid aperture, said power supply means being adapted to effect the passage of increasing amounts of current through said control conductor first in one direction and then in the opposite direction to thus form at least one of said domain walls in said ferromagnetic thin film and effect movement of said one wall to selected radial positions in said toroid including the area where said thin section of insulation is disposed between said films to thus effect said transition of said superconducting thin film.

3. The system set forth in claim 2, wherein said toroid has a thickness of about 1000 A., said superconducting thin film has a thickness of about 2000 R., said thick section of insulation has a thickness of about 5000 A., and said thin section of insulation is of a selected thickness in the range from 0 to 1000 A.

4. The system set forth in claim 1, wherein said ferromagnetic thin film is fabricated from Permalloy and is in the shape of a rectangle, said superconducting thin film is fabricated from indium and is in the shape of a long and narrow thin strip and positioned at an angle with respect to the longitudinal axis of said rectangular Permalloy film, said electrical lead control conductor being in the shape of a long and narrow thin film and being positioned adjacent to said Permalloy film with said Permalloy film separating said indium film and said lead control film, a second thin layer of insulation being disposed between said Permalloy film and said lead control film, said lead control film being positioned at an angle close to 90° with respect to said indium film, said power supply means being adapted to provide a positive control current to said lead control film to effect the formation of said domain walls in said Permalloy film, said domain walls in turn effecting said transition of said indium superconducting thin film.

5. The system set forth in claim 4, wherein said Permalloy film has a thickness of about 1000 A., said indium film has a thickness of about 1500 A., said first thin layer of insulation between said indium and Permalloy films is silicon oxide and has a thickness of about 500 A., said lead control film having a thickness of about 5000 A., said second thin layer of insulation between said Permalloy film and said lead control film is silicon oxide and has a thickness of about 2000 A., and said positive control current having a value of at least +100 ma.

References Cited

UNITED STATES PATENTS

| | | | |
|---|---|---|---|
| 2,980,807 | 4/1961 | Groetzinger et al. | 307—277 |
| 3,048,707 | 8/1962 | Nyberg | 307—245 |
| 3,116,422 | 12/1963 | May et al. | 307—245 |
| 3,125,688 | 3/1964 | Rogers | 307—245 |

DONALD D. FORRER, Primary Examiner

H. A. DIXON, Assistant Examiner

U.S. Cl. X.R.

307—298, 306